United States Patent [19]

Gallistel et al.

[11] 4,101,913

[45] Jul. 18, 1978

[54] FOUR-UP POLAROID CAMERA

[75] Inventors: Albert F. Gallistel, Wayzata; Jerome W. Lindenfelser, Minneapolis, both of Minn.

[73] Assignee: Photo-Control Corporation, Minneapolis, Minn.

[21] Appl. No.: 633,248

[22] Filed: Nov. 19, 1975

[51] Int. Cl.² .............................................. G03B 35/00
[52] U.S. Cl. ...................................... 354/122; 354/125
[58] Field of Search ............... 354/118, 119, 120, 121, 354/122, 123, 125, 139, 147, 149, 250, 251, 254

[56] References Cited

U.S. PATENT DOCUMENTS

| 475,919 | 5/1892 | Barril | 354/121 |
|---|---|---|---|
| 3,504,607 | 4/1970 | Bok | 354/120 |
| 3,584,557 | 6/1971 | Haller | 354/125 |
| 3,598,035 | 8/1971 | Haller | 354/121 |

Primary Examiner—L. T. Hix
Assistant Examiner—Alan Mathews
Attorney, Agent, or Firm—Schroeder, Siegfried, Ryan, Vidas & Steffey

[57] ABSTRACT

A plural photographic camera with a plurality of objective lens for making a number of identical photographs utilizing a single shutter mechanism with different disc apertures to align with the camera obscura in exposing portions of the film. By rotating the disc it will direct the aperture or apertures therein past the plural lens to expose the film in a desired sequence and reset of the shutter mechanism without exposure is effected by utilizing covering blades or masks which rotate into position in the reset direction to close the aperture or apertures in the disc. The shutter mechanism is readily interchangeable for varying shutter configurations.

17 Claims, 12 Drawing Figures

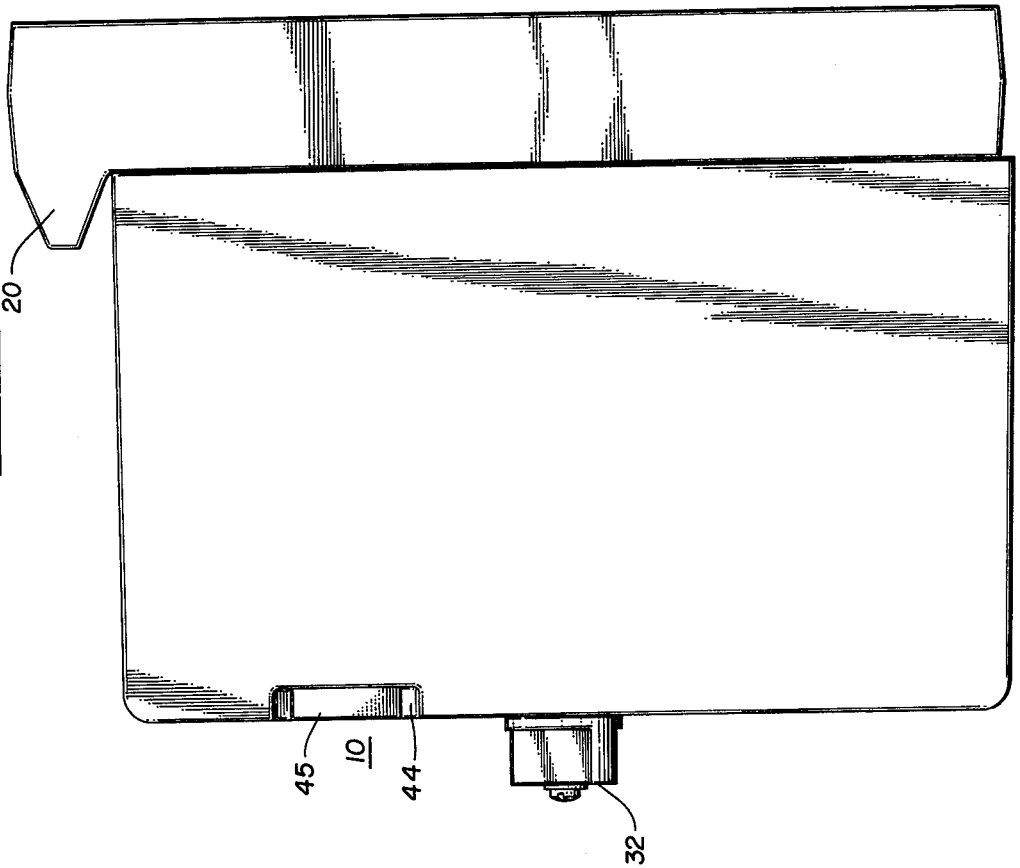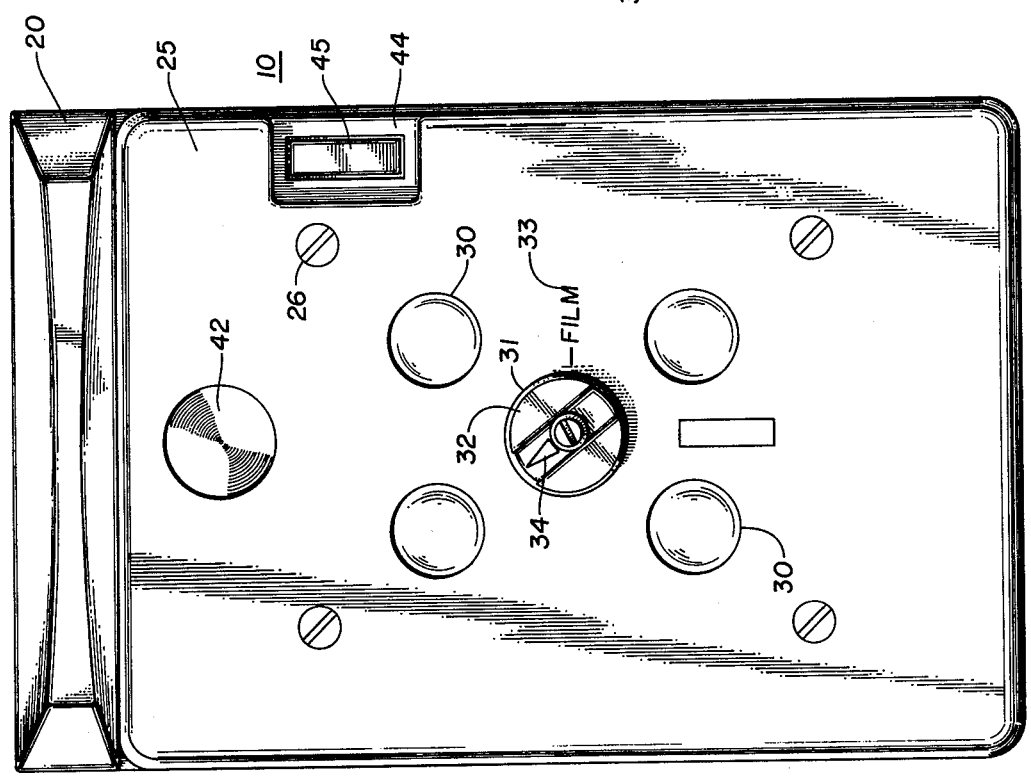

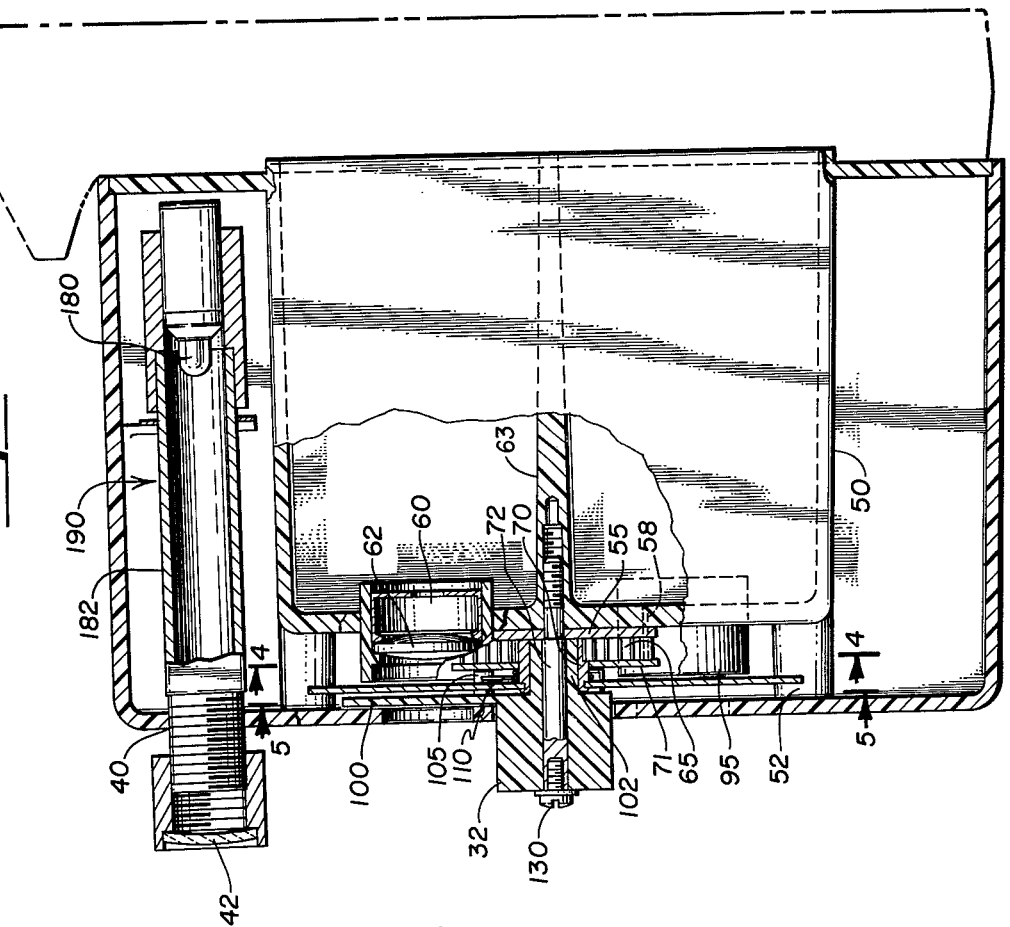
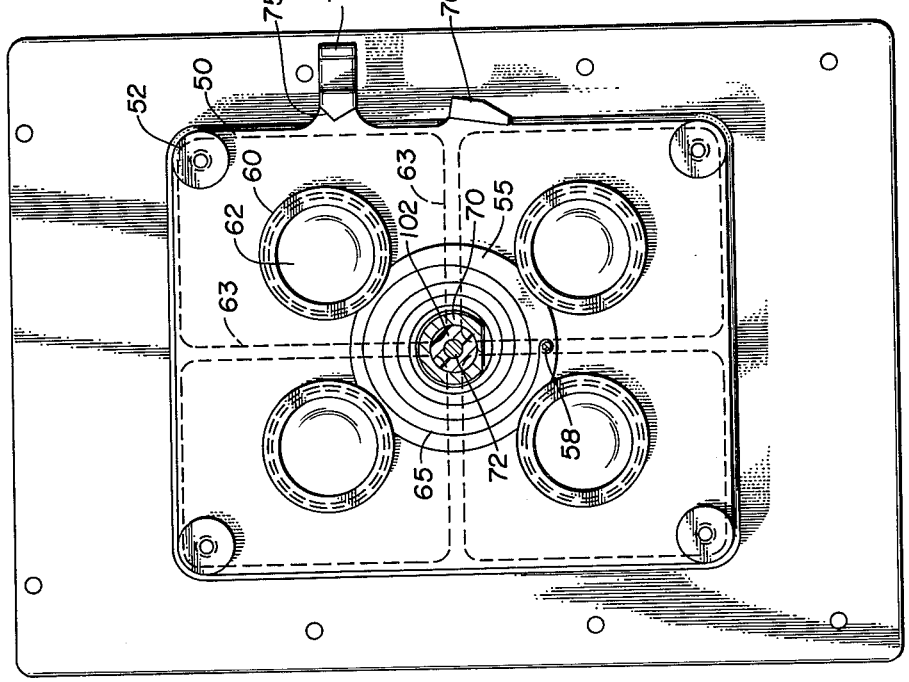

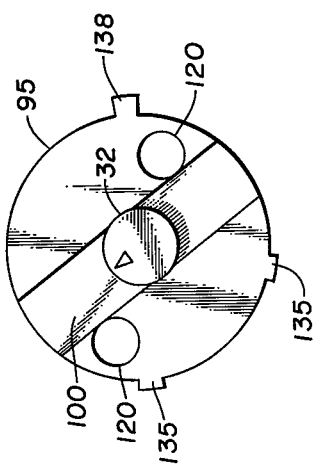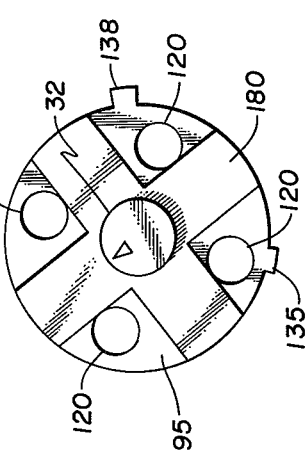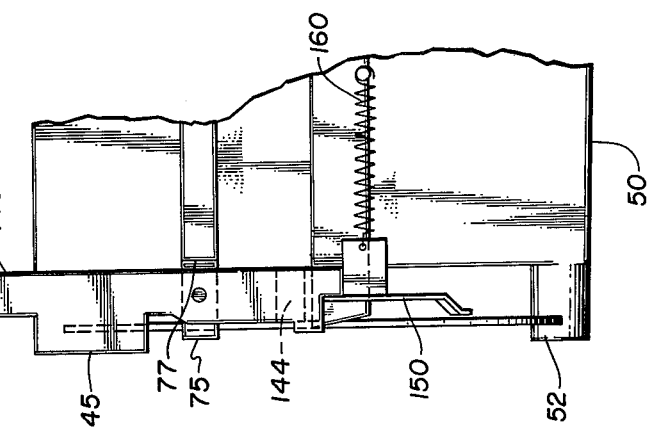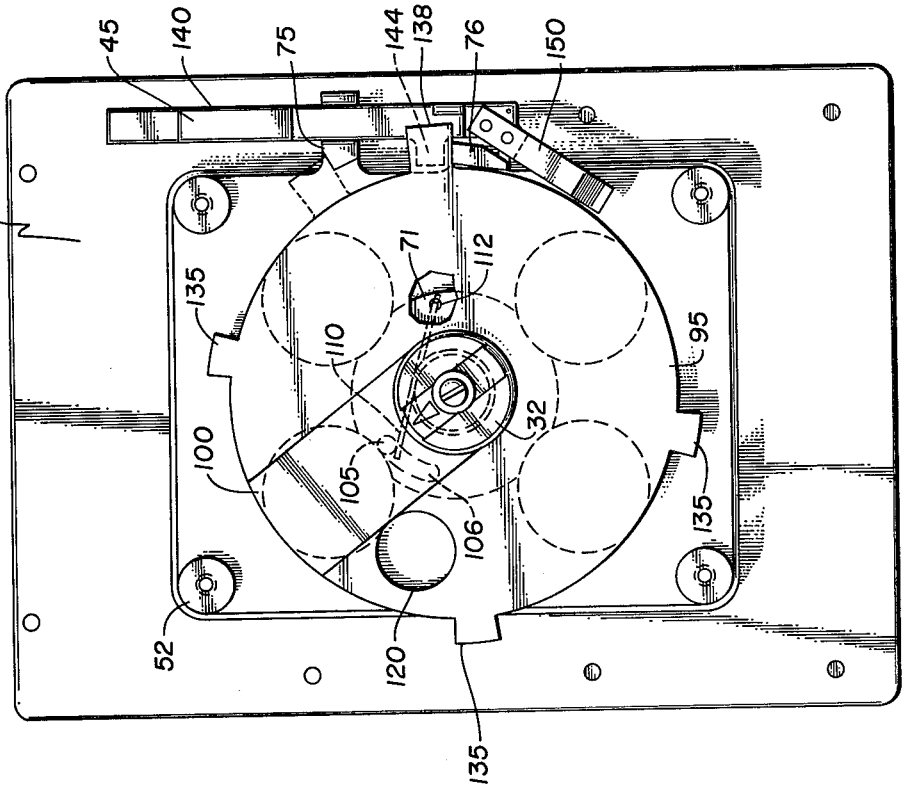

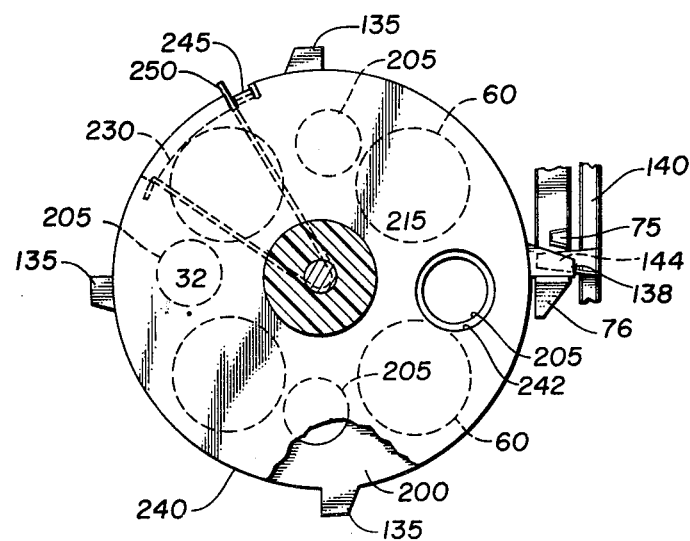
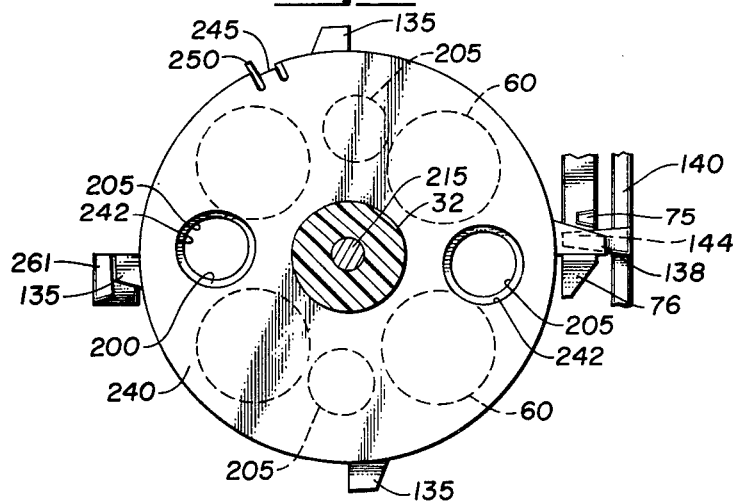

FOUR-UP POLAROID CAMERA

The invention relates to a photographic camera having a plurality of objective lens whose optical axes are mutually parallel for the making of a plurality of individual separate photographs on the same segment of film while the film remains stationary.

Cameras for making a plurality of exposures of the same subject on a light sensitive sheet of film through the use of a plural lens system are old and in use. This procedure is particularly applicable in the Polaroid process such as in the making of identification cards, passport photos, or the like, where it is desirable to have a picture that is smaller than the size of the standard Polaroid picture. Thus, in the past, such cameras have been used to divide a picture into plural segments, such as four, providing a savings in the cost of making the pictures on a single sheet of Polaroid film. Most of the prior art cameras of this type have utilized separate lens and iris systems and complex shutter arrangements with individually actuatable shutters for making the separate photographs. Such cameras are further not adjustable for varying the number of simultaneous shots on a single sheet of film. Still other cameras have required rotation of the back of the camera with each exposure or rotation of a prism through a required angle or the shifting of the back of the camera rectilinearly to divide the shots into the film segments. All of these devices in use have a common disadvantage in that systems are comparatively complex which make them expensive and prone to break down and have service problems.

The present invention is directed to a simplified plural camera using the Polaroid process in which a simplified shutter arrangement with a plural lens system provides for the making of four individual pictures on a single film segment, two different sets of pictures on the same film segment or four identical pictures on the same film segment through the simple expedient of a simplified and readily removable shutter mechanism and the substitution of a different one therefor. Therefore, the improved camera providing the "four-up" exposures is very simple inexpensive in construction, is easy to use and is dependable in function with a very long service life.

It is, therefore, the object of this invention to provide an improved plural camera using the Polaroid process for taking a number of pictures on a single film segment without moving the film.

Another object of this invention is to provide a simplified camera which is inexpensive to build and is dependable in function.

A further object of this invention is to provide a simplified camera of this type in which the shutter mechanism may be readily interchanged to effect taking of different film sequences.

A still further object of this invention is to provide a simplified flash operating circuit with the simplified shutter mechanism.

These and other objects of the invention will become apparent from the reading of the attached description, together with the drawings wherein:

FIG. 1 is a front elevation view of the improved plural camera;

FIG. 2 is a side elevation view of the same;

FIG. 3 is a side elevation view of the camera with the cover in section and parts broken away;

FIG. 4 is a sectional view of the camera of FIG. 3 taken along the lines 4—4 therein;

FIG. 5 is a sectional view of the camera of FIG. 3 taken along the lines 5—5 therein;

FIG. 6 is a side elevation of the sectional view of FIG. 5 showing the shutter release and flash circuit;

FIG. 7 is a schematic view of the shutter mechanism modified for taking two pairs of identical poses;

FIG. 8 is a schematic view of the shutter mechanism modified for taking four identical poses with a single exposure;

FIG. 11 is a schematic view of the shutter mechanism of FIG. 9 modified for taking two identical poses with a single exposure; and, FIG. 12 is a schematic view of the shutter mechanism of FIG. 9 modified for taking one pose with a single exposure.

Figure 9:
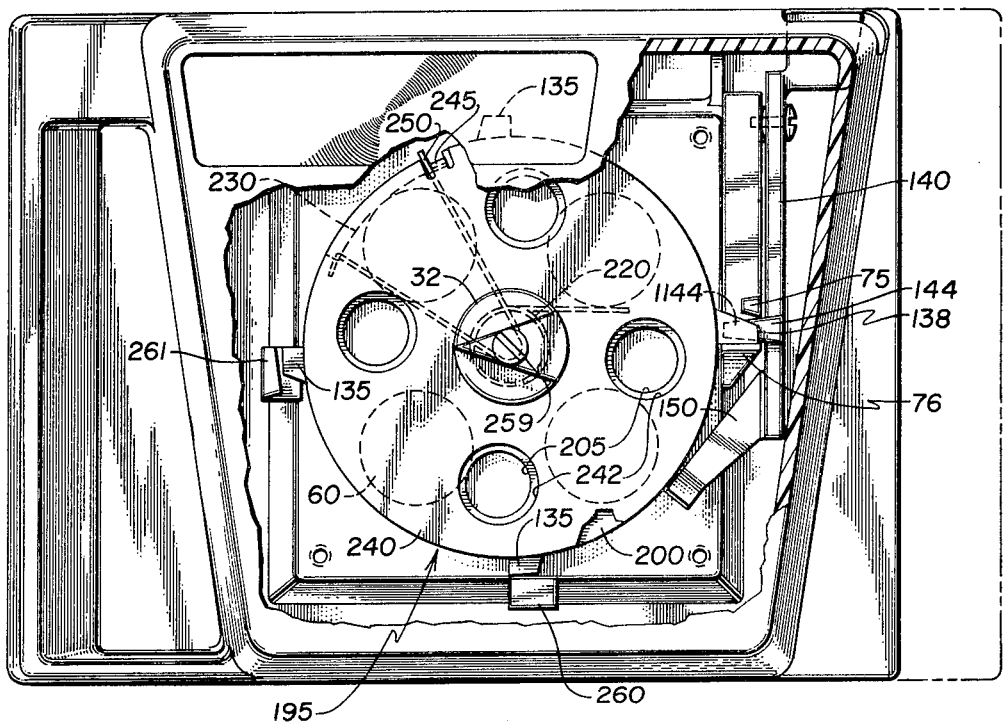
FIG. 9 is a front view of the camera with the cover in part broken away showing an alternate embodiment of the shutter mechanism for taking four identical poses with a single exposure.
Figure 10:
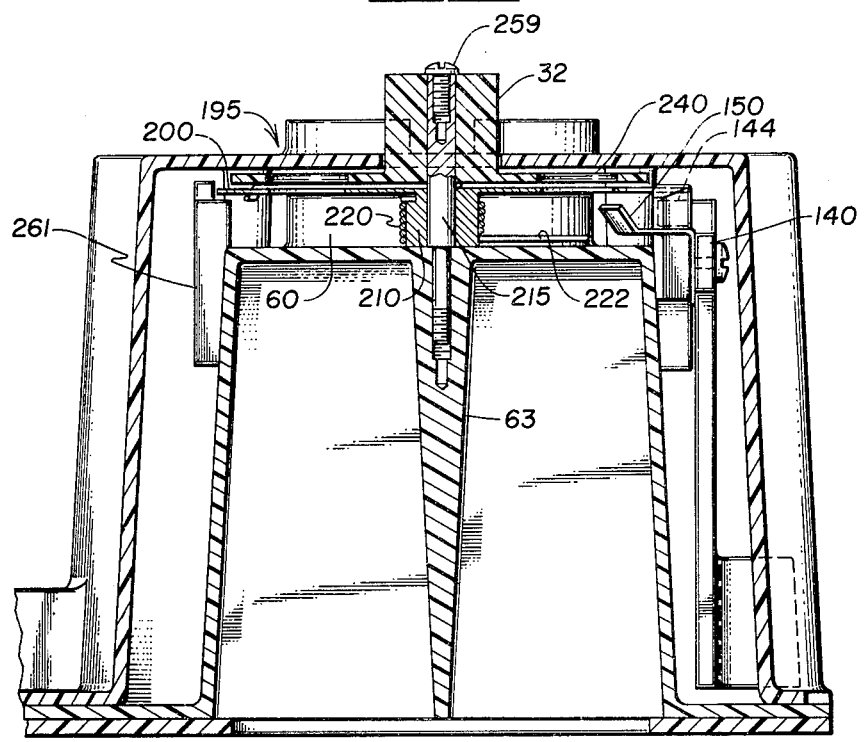
FIG. 10 is a side elevation view of the camera of FIG. 9 the cover and parts broken away.

In FIGS. 1 and 2, I have the improved plural camera generally at 10. The camera as shown herein includes a film pack of back frame 20 of the "Polaroid" or as a magazine for film developed through the Polaroid process with internal means for advancing the film therein. This film pack or frame may take varying forms but consistent with the aspects of the plural camera it is desired to expose portions of a film frame either in sequence or simultaneous with the identical poses. The details of the film pack are omitted since they form no part of the present invention, and it will be understood that the face upon which the remainder of the camera is mounted is open to receive light for exposing the film within the film pack in any desired sequence.

As shown in FIGS. 1 and 2, the multiple or plural camera is enclosed by a cover 25 which as will be seen in FIGS. 1 and 2, is secured to the remainder of the camera through a series of screws 26. In the present disclosure, the film frame is to be exposed in four segments which may be taken as selectively four independent poses, two pairs of identical poses, or four identical poses with a single shutter operation, as will be hereinafter identified. Thus, the cover shows four apertures 30 therein which as will be later identified aligned with camera obscura beneath the cover. Also projecting through an aperture 31 in the center of a cover is an adjusting knob 32 with suitable indicia 33 positioned on the face of the cover and a pointer 34 on the adjusting knob to indicate the particular film exposure to be taken. The cover also includes an aperture 40 through which a focusing lens indicated at 42 for a light extends and a recessed portion 44 through which a shutter release button 45 extends.

Referring to FIGS. 3 and 4, it will be seen that positioned on the top of the film pack 20 is a frame indicated generally at 50 having outstanding mounting posts 52 generally at the corners of the same and enclosing the opening in the film pack. The frame houses four separate camera obscura 60. Each camera obscura including a separate lens 62 and an enclosing housing 63 which fits within the frame and divides the frame into four separate isolated segments being exposed or open at the film pack extremity for the purpose of focusing light and an image on the segments of the film. The mounting posts 52 have threaded apertures therein through which the mounting screws 26 extend to secure the cover thereon. As indicated in FIG. 3, a disc-like mounting member 55 is secured to the edge of the frame through a pin 58. Positioned on the disc 55 is a coil spring 65 having one end 66 attached to the disc and another end attached to a sleeve member 70 which is positioned on a shaft member 72 extending from the frame between the camera obscura. As will be seen in FIG. 3, the spring 65 is positioned between disc 55 and collar 71 mounted on a sleeve 70 to enclose the same therein. The camera obscura in effect provides a plural lens structure which isolates the film segments into four equal picture segments with the obscura being enclosed so that no light leakage enters upon the film segment except through the lens 62. Also positioned on the frame is a fixed flange or stop member 75 which defines the limit of rotation of the shutter mechanism to be later defined. A second stop mechanism 76 is positioned on the flange as is a support flange 77 for the shutter release mechanism.

The sectional view of FIG. 5 best shows the shutter mechanism 90 which is comprised of a shutter disc 95 carried by sleeve member 70 and a mask or covering blade 100 carried by the knob 32 and journaled on post 72 within the sleeve 70. The spring 65 rotates the shutter disc 95 and sleeve in one direction, that is clockwise as seen in FIG. 5, and the knob 32 rotates the blade 100 and ultimately rotates the disc 95 in a counter clockwise direction. It will be understood that while we have shown a masking blade to cover the aperture in the shutter disc when the shutter mechanism is reset, the blade or blades may take other forms. It is designed to prevent exposure of the film in the reset direction. Thus, the blade may be a disc similar to the shutter disc with the apertures therein which align with the shutter disc apertures in the rotation of the shutter mechanism to expose the film, but which will be offset from the shutter disc to cover the aperture in the reset direction upon relative motion therebetween, as will be hereinafter noted. Thus, will be seen in FIGS. 3 and 5, the knob 32 has formed integral therewith the blade 100 and a shaft section 102 of the knob projects into the sleeve 70 mounting the shutter disc. The blade has a flange pin 105 attached thereto or formed integral therewith which extends through a slot 106 in the shutter disc 95. A small spring 110 has one end bearing against the pin on the blade and is secured at its other end to the collar 71 fixed to the sleeve 70 as at 112 to bias the blade relative to the disc.

Depending upon the number of identical poses to be taken simultaneously with the shutter mechanism, the aperture arrangement in the shutter mechanism and the configuration of the blade will vary. Thus, as shown in FIG. 5, the shutter disc 95 has a single aperture 120 therein and the blade 100 which is formed integral with the knob 32 is journaled on post or pin 72 projecting into the frame and held thereon by a screw 130. The blade 100 will rotate relative to the aperture 120 in the disc 95 for the purpose of covering the same. The rotation of the blade 100 relative to the disc is through a limited range of rotation as defined by the slot 106 in the disc and the pin 105 projecting into the same. The shutter disc also includes a number of stop or flange members thereon such as are identified at 135 and a final stop member 138 positioned thereon. Thus, in FIG. 5, three shorter stop members or flanges 135 are positioned on the disc and one longer flange member 138 is positioned on the disc. The shutter mechanism will be held ready to take a series of pictures in a rest or start position through the engagement of a stop member 138 with the stop flange 76 on the frame. When released, the disc will rotate in a clockwise direction as viewed in FIG. 5 through the influence of spring 65 such that the aperture 120 will pass one of the lens 62 of the camera obscura 60 and stop intermediate or between said lens and the next adjacent lens of the plural camera system through the engagement of a stop member 135 with the flange 76. Subsequent operation of the shutter mechanism will release the disc to rotate the aperture 120 past the next camera obscura taking the next film segment. This procedure will be continued until the aperture 120 has passed all of the camera obscura and the enlarged or longer stop member 138 engages the stop flange 75 on the frame preventing further rotation of the shutter disc in a clockwise direction. At this point, an indicia 33 positioned on the cover will coincide with the pointer 34 on the knob 32 indicating that the film frame has been completely exposed and the film in the film pack should be moved to bring a new film frame adjacent the camera obscura. The shutter mechanism is then reset by manually moving the knob 32 in the counter clockwise direction as viewed in FIG. 5. Initial movement of the knob 32 with the blade 100 attached thereto will permit relative movement between the blade 100 and the disc 95 by virtue of the pin and slot arrangement coupling the disc and the blade. Also, the spring 110 biasing the blade 100 to the end of the slot in the clockwise direction and keeping the aperture 120 in the disc 95 uncovered will with counterrotation permit the blade 100 to be rotated to cover the aperture 120 in the disc 95 before the disc is positively engaged. The difference in bias between the springs 110 and 65 is such that the spring 65 is of significantly higher tension and will permit movement of the blade relative to the disc to cover the aperture 120 before the disc begins to move through engagement of the pin in the opposite end of the slot 106. Thus, with the aperture 120 covered, the disc then may be rotated in a counterclockwise rotation with the stop members or flanges 135 in the periphery of the same sliding over the ramp type surface on the stop 76 until the longer stop flange approaches the stop abutment 75. Since this longer flange 138 will not pass the stop abutment, it defines a limit of rotation in both the reset and release direction. Depending upon the number of exposures which are to be taken with each shutter arrangement one of the flanges 135, 138 will rest against the flange abutment 76, and prevent any clockwise rotation of the disc indicating that the shutter mechanism has been reset. During this period of time, the blade will have been positioned to cover the aperture 120 in the disc so that none of the film in the film pack will have been exposed. The next sequence of picture taking will be effected by sequentially operating the shutter mechanism 75 by depressing the shutter release button 45.

As will be seen in FIG. 6, the shutter release button 45 is included on a lever 140 pivoted on flange 77 and with an extension of the same having a raised surface 144 which is adapted to ride under the flanges 135 and 138 on the disc and raise the same above the level of the stop abutment flange 76 on the frame, releasing the disc for limited rotation until the next abutment is reached. Also, as shown in FIG. 6, an electric contact circuit in the form of a contact blade 150 carried on the end of the lever 140 is adapted to be contacted by the flanges 135, 138 as the shutter disc rotates. Suitable electrical connection (not shown) connected to the blade 150 and disc 95 complete a circuit through a battery source and to a flash attachment (not shown) for operating a flash attachment upon disc rotation. A spring 160 connected between lever 140 and the frame bias the lever to a raised position for button 45. As the shutter mechanism is operated by depressing button 45 of the lever 140, the blade 150 is raised by the opposite end of the lever to be in the path of the flanges on the disc 95. Once the stop flange 135 and 138 on the disc is raised to clear the flange or abutment 76, holding the same against rotation, it will ride over the surface of the blade 150 making contact therewith to complete a circuit as the shutter mechanism is rotated to cause an aperture 120 therein to pass a camera lens or obscura within the multiple camera exposing a portion of the film pack.

As will be seen in FIGS. 7 and 8, the shutter mechanism will be varied for different types of film exposures. Thus, in FIG. 7, there is shown schematically the disc 95 with two apertures 120 therein. The blade 100 attached to the knob 32 extends radially or diametrically across the disc such that the ends of the same will respectively cover the apertures 120 therein. With the shutter arrangement, two pairs of identical poses will be taken. The first exposure will expose a first pair of diametrically opposed camera obscura 60 and the second exposure will expose the remaining diametrically opposed camera obscura 60. The stop flanges 135, 138 on the disc remain the same with the exception that only two stop flanges 135 are required. This change in shutter mechanism may be effected simply by removing the screw 130 holding the knob 32 and lifting out the entire assembly of the shutter blade 100, the disc 95, the associated springs and their supports on the post 72 and replacing the same with a new shutter mechanism and blade designed to have a different number of apertures and a slightly different blade configuration to cover the apertures as the shutter mechanism is reset. The same slot and pin configuration between the blades and shutter exist and the same spring connections and spring rates exist between the spring 65 and 110.

In FIG. 8, another shutter configuration is shown in which the shutter disc 95 has four apertures 120 therein and a blade configuration 180 which is generally cruciform such that the ends of the same will cover the respective apertures 120. The flange configuration of this disc requires only a single short flange 135 and a long flange 138 such that four identical poses will be taken with a single shot. Thus, the shutter mechanism is released by raising a single flange 135 over the stop 76 and the stop flange 138 will limit rotation as the pictures are taken by engaging stop member 75. The parts configuration except for the shape of the blade and the number of apertures in the disc remain identical with a previous disclosure.

Also included on the camera is a means for aligning the same with the subject so that the plural lens system or the camera obscura will see substantially identical poses for each of the camera obscura. This is a light mechanism indicated generally at 190 in FIG. 3. The lens 42 which is mounted on the camera frame and projects through the cover as indicated at 40. Within the cover and mounted on the camera frame 50, is a bulb 180 arranged to project light through a tubular member 182 and onto lens 42 which may be a Fresnel lens to focus and direct a light beam on the subject. Thus, the camera operator will identify the pose and locate his subject by directing the faint light beam on the subject so that the camera obscura aligned therewith will see the same pose or be aligned with the subject in this manner. Other aligning means may be utilized and the details of the light circuit are omitted for simplicity since they form no part of the present invention.

In FIGS. 9 - 12 there is shown a modification of the shutter mechanism for the various versions of the plural photographic camera which is adapted to take either four identical poses on a single sheet of photographic film with one shutter operation, two pairs of identical poses with two shutter operations, or four individual poses in sequence with four shutter operations. For simplicity, the front and side elevation views of FIGS. 9 and 10 have parts broken away and the cover removed to simplify the disclosure, it being understood that the same basic film pack 20 and frame mounted thereon is employed. The frame 50 will house the four separate camera obscura 60 in the housing 63 and the shutter mechanism will be reset through the manual adjustable knob 32 extending through the cover at the front of the camera. In this embodiment, the basic configuration of the shutter disc and masking disc differ from the embodiment shown in FIGS. 1 - 8, simplifying the interchange of the shutters for the various shutter configurations. Thus, in FIGS. 9 and 10, the shutter mechanism, identified generally at 195, employs the same pivoted lever 140 with the projecting flange 144 to release the shutter mechanism for taking the various film exposures. For simplicity, the details of the electric circuit for the flash mechanism is omitted except for the movable electric contact finger 150 connected to the end of the pivoted lever 140 of the shutter release mechanism.

The shutter disc 200 in this embodiment includes four shutter exposure apertures 205 therein spaced apart in diametrically opposed relationship similar to the camera obscura which they cover. The shutter disc is mounted on a sleeve 210 which is journaled on the camera housing 63, through a post 215 secured to the housing 63, the post or shaft member 215 being threaded into the housing and secured thereon. A suitable coil spring 220 is mounted around the sleeve 210 and is secured at one extremity to the housing as at 222 with the other extremity being connected to the sleeve 210 with the disc thereon to bias the disc, as will be hereinafter noted. Disc 200 has formed integral therewith three short flange members 135 and one long flange member 138, the flange members being located in opposed diametrically relationship and slightly offset from the apertures in the disc. The peripheral edge of the shutter disc includes a notched portion 230 for purposes to be later noted. Cooperating with the shutter disc 200 is a masking disc 240 which is also journaled on the upper portion of the post 215 and carries the manual reset knob 32 formed integral therewith. Depending upon the particular shutter configuration, the masking disc may have 1, 2, or 4 apertures 242 therein which will be hereinafter identified. Thus, as shown in FIG. 9, the masking disc has four such apertures therein which are slightly larger than the apertures in the shutter disc and are adapted to align therewith for exposing the film through the individual camera obscura. With this configuration, four identical poses will be made with a single shutter mechanism operation. The masking disc has a bent flange tab 245 on the peripheral edge of the same which is adapted to ride in a notch 230 in the shutter disc. A hairpin type spring mechanism 250 having its closed extremity positioned around the post has one extremity engaging the edge of the notch 230 in the shutter disc and the other extremity riding against the bent flange 245 in the masking disc. Since the bifurcated ends of the hairpin type spring are biased to spread apart, the engagement of the ends of the same with the notch 230 and the flange or tab 245 will urge the masking disc in a direction where the bent flange 245 engages one end of the notch. In this condition of bias, the apertures 242 in the masking disc align with the apertures 205 in the shutter disc. A suitable screw member 259 threaded into the end of the post 215 and abutting the end of the knob 32 holds the knob and the masking disc integral therewith against the shutter disc but permits relative movement therebetween. Such relative movement will be permitted by movement of the flange 245 in the notch 230 of the shutter disc against the tension of the spring 250. This will permit movement of the apertures 242 in the masking disc out of alignment with the apertures 205 in the shutter disc in a manner similar to the beforementioned embodiment. Such rotation will be counterclockwise as seen in FIG. 9 and will be effected by rotation of the knob in the counterclockwise or reset direction of the shutter mechanism as will be hereinafter defined. In this embodiment of the shutter mechanism, as distinguished from that disclosed in FIGS. 1 - 8, the shutter disc 200 is permanently mounted on the post 215 through its bias spring 220 and contains the fixed number of four stop flanges, three of which are identified at 135 as of the short version and one identified as the longer or final stop version 138. The fixed stops 75, 76 on the camera housing are utilized together with removable stop flanges mounted on the housing as additional stop flanges, as will be hereinafter identified. These removable flange members, identified at 260, 261, operate as limit flanges similar to the operation of the fixed flange 75 on the camera housing. Thus, depending upon whether the shutter configuration is to take four identical poses and rotate through a 90° quadrant in exposing all four camera obscura or two pairs of identical poses by rotating through two 90° quadrants of the shutter rotation or four individual poses requiring the shutter mechanism to rotate through approximately 330° of shutter rotation, one or the other of the removable stops 260, 261 or neither will be present on the camera housing. In the embodiment shown in FIG. 9, four identical poses will be taken with a single shutter movement and in the biased or cocked position of the shutter mechanism, the long stop flange 138 on the disc 200 will be abutting flange 76 against the tension of the spring 220. The removable flanges 260 and 261 like the flange 75 are so positioned as to be free of engagement by the shorter flanges 135 on the shutter disc and therefore, will not be engaged thereby during rotation of the shutter disc. The fixed flange 76 on the camera housing will engage all of the shorter flanges 135 as well as the longer flange 138 and will be released therefrom by operation of the lever 140 to raise a flange portion 144 formed integral therewith to raise the respective stop flange members 135, 138 above the flange 76 to release the shutter disc for rotation. This rotation will take place in the clockwise direction as seen in FIG. 9. Thus, with the shutter arrangement shown in FIG. 9, the longer stop flange 138 when released from the flange 76 will rotate until it engages the flange 260 located approximately 90° from the flange 76 allowing one 90° quadrant of shutter rotation. This will align all of the apertures 205 on the shutter disc and 242 in the masking disc with the respective camera obscura as the 90° rotation takes place. The longer stop flange 138 will bear against the removable flange 260 because of the length of the same and will prevent any further rotation of the shutter mechanism. Since all segments of the film corresponding with the camera obscura 60 will have been exposed, the shutter mechanism will then be reset for the next film frame by engaging the knob 32 and rotating the masking disc and the shutter disc in a counterclockwise direction. Initial rotation of the masking disc 240 will cover the apertures 205 on the shutter disc preventing further exposure of the film beneath the camera obscura as the shutter mechanism is reset, bringing the long stop flange 138 back in the counterclockwise direction until the stop 75 is engaged which will place the flange 138 in front of the flange 76 and will hold the shutter mechanism in this position due to engagement of the edge of the flange 138 with the edge of the fixed stop flange 76 on the camera frame under the influence of spring bias or spring 220. With this operation and with a single operation of the shutter mechanism, four identical poses will have been exposed on the single film segment. As in the before mentioned embodiment, the indicia on the knob when rotated through the 90° quadrant will rest on the indicia indicating the film change requirement. The shutter mechanism can then be reset back to its original position without further exposure of the film because of the masking disc apertures are disaligned with the shutter disc apertures with the counterclockwise rotation of the shutter mechanism.

The schematic embodiments shown in FIGS. 11 and 12 show variations of the shutter mechanism for effecting two identical poses or four individual poses on one film frame. Thus, in FIG. 11, the shutter disc remains in the same configuration having four apertures 205 therein and the four stop flanges 135, 138 thereon. The masking disc 240 in this embodiment utilizes two apertures 242 therein and the masking disc is coupled to the shutter disc through the notch 230 and bent flange 245 configuration as in the aforementioned embodiment with the spring 250 biasing the masking disc to a position where the two apertures 242 therein align with two of the apertures 205 in the shutter disc 200. The fixed stop configuration in this embodiment varies by the removal of the fixed stop member or flange 260 from the camera housing and the retaining of the fixed stop mechanism 261 thereon. Thus, the elongated or longer stop flange 138 on the shutter disc will be permitted to rotate through approximately 180° before it engages the fixed flange 261 on the camera housing limiting further rotation of the shutter mechanism. With the shutter mechanism in a cocked or rest position before exposure of the film, the elongated flange 138 is engaged in the fixed flange 76 on the camera housing. The shutter release lever 140 with its release flange portion 144 thereon will raise the flange 138 over the fixed stop member 76 and permit a 90° rotation until the first of the stop members 135 on the shutter disc rotate past the fixed flange 75 on the camera housing and engages the flange 76. This rotation in a clockwise direction will permit an exposure of two of the camera obscura through alignment of two of the apertures 205 on the shutter mechanism with two of the camera obscura 60. A second operation of the shutter mechanism through movement of the shutter release lever 140 will raise the stop flange 135 engaging the fixed flange 76 above the same, allowing the shutter mechanism to rotate through another 90° quadrant until the longer stop flange 138 engages the fixed flange 261 on the camera frame. The diametrically opposed and shorter stop flange 135 on the shutter mechanism will have cleared the stop flange 75 on the camera frame and it will be engaging the stop mechanism 76 at the same time. However, a further release will be prevented because of the long stop flange 138 engaging the flange 261. At this time the knob 32 on the masking disc will be aligned with the indicia on the cover indicating complete exposure of the film and the need for resetting the film before further exposure. Reset of the shutter mechanism is affected by engaging the manual knob 32 and rotating the same in a counterclockwise direction bringing the shutter mechanism around until the flange 138 engages the fixed flange 75. The relative rotation which takes place between the masking disc and the shutter disc at this time covers the apertures 205 in the shutter disc so as not to further expose the film. With the elongated flange 138 located between and behind the stop flange 76, the shutter mechanism is reset for further exposure of film.

The embodiment shown in FIG. 12 utilizes the same shutter disc, and fixed stop members 75, 76 with the shutter release lever 140. The masking disc in this embodiment utilizes a single aperture 242 therein which is aligned with one of the apertures 205 in the shutter disc. The same stop flange configuration is employed on the shutter disc, namely, the three short flange members 135 and the one elongated flange member 138 which is the set position, will be behind the fixed stop member 76. In this embodiment, the removable stop flange members 260, 261 are removed from the camera frame allowing the shutter mechanism to rotate the longer stop flange member through approximately 330° in a clockwise direction until it engages the fixed stop member 75 on the camera frame. This is the ultimate limit of rotation of the shutter mechanism. During this period of time four individual poses will have been effected since the shutter mechanism will rotate through a 90° segment before one of the shorter stop flange members engages the fixed flange member 76 having cleared the stop member 75. When released, another quadrant or 90° segment of rotation will take place in the shutter mechanism until the next succeeding stop flange 135 engages the fixed stop member 76. In the operation of this configuration of the shutter mechanism, continued release of the three shorter stop flange members 135 will take place to effect the four substantially equal segments of the shutter rotation until the elongated stop flange member 138 on the shutter disc 200 engages the fixed flange 75 preventing further rotation of the shutter mechanism. At this time, four individual exposures would have taken place successively on the single film segment. The shutter mechanism is reset in the same manner by engaging the knob 32 and rotating the masking and shutter disc in a counterclockwise direction with the initial rotation effecting displacement of the masking disc 240 with the apertures 205 in the shutter disc to cover the same as the reset operation continues. The shutter mechanism will be rotated substantially 330° in a counterclockwise direction until the elongated flange engages the fixed stop 75 at which point it will be behind the stop release flange 76.

In the various embodiments of FIGS. 9 – 12 the indicator on the reset knob is positioned relative to the masking disc and the apertures therein so that the limited rotation required for maximum displacement of the shutter disc will bring the indicia into alignment indicating complete film exposure. Thus, the knob will rotate roughly 90° for four simultaneous exposures and through approximately 330° for four individual exposures. With this simplified arrangement, the shutter disc and its bias mechanism remains unchanged and only the masking disc, its bias spring, and the removable stop members 260, 261 are altered to change the shutter mechanism from one exposure configuration to the other exposure configuration. The masking disc will have either four apertures, two apertures or a single aperture therein and only the masking disc portion of the shutter mechanism together with its adjusting knob and the removable stop members 260, 261 will be altered. These changes may be simply effected by removing the cover of the plural camera and adjusting the substituting parts of the shutter mechanism to effect the change. In the embodiments shown in FIGS. 9 – 12, the remaining details of the camera mechanism are omitted, together with the electrical flash circuit for the flash attachment, but it will be understood that these may take the same form as those previously described.

The improved plural camera provides a shutter mechanism which is simple in design and fool-proof and easy to use. It enables the operation of a plural camera to take a plurality of poses and a single film segment for economy in film so that four identical poses, two pairs of identical poses and four independent poses are positioned on a single film segment. The interchange of the shutter mechanism to effect such changes in poses or exposure is simply accomplished by removing the cover and substituting a different shutter mechanism therefor. The shutter mechanism further prevents exposure of the film in resetting the shutter by covering the aperture or apertures with the simplified mechanism which positively insures against light leakage.

While we have described the plural camera as particularly adapted for the Polaroid process and with a film pack for Polaroid type, it may be recognized that for the purpose of the plural camera and with appropriate size film that the same principle may be used in any other type of film and with an appropriate film pack. Therefore, in considering the invention, it should be remembered that the disclosure is illustrative only and the scope of the invention should be determined by the appended claims.

What I claimed is:

1. A plural camera comprising, a film pack enclosure and a means for advancing the film therein for individual film frames, a camera frame mounted on the film pack enclosure, a plural camera lens structure positioned on the camera frame in front of the film frame to be exposed and including means for isolating a portion of the film frame for each of the lens of the plural lens structure, a single shutter mechanism positioned in front of the plural lens structure, said shutter mechanism being comprised of a disc with at least one aperture therein journaled on said frame for rotation relative to the plural lens structure so that at least one of said apertures in the disc aligns with a lens of the plural lens structure, spring means connected between said disc and said frame and biasing said disc for rotation in a predetermined direction, plural stop means formed on the periphery of said disc, one of said stop means being adapted to engage a fixed abutment mounted on the camera frame for defining limited rotation of the disc in said predetermined direction, a shutter release mechanism, each of said stop means being designed to engage said shutter release mechanism when positioned adjacent to the shutter release to restrict rotation of the disc, said disc when released from said stop means having limited rotation in said predetermined direction to bring at least one of said apertures in the disc into alignment with one of the lens of said plural lens structure, means for covering said aperture when said disc is rotated in a direction opposite to said predetermined direction, and means for manually rotating said disc in said opposite direction, said means for covering said aperture when said disc is rotated in a direction opposite the predetermined direction being a blade for covering the aperture which is journaled on the frame and movable relative to the disc a limited second rotation.

2. The plural camera of claim 1 in which the number of lens in the plural lens structure is four, dividing a portion of the film to be exposed into four separate isolated film portions.

3. The plural camera of claim 5 in which the number of apertures in the shutter disc is at least two.

4. The plural camera of claim 5 in which the number of apertures in the shutter disc is at least four.

5. The plural camera of claim 1 and including a second spring means connected to the blade and biasing the blade in the predetermined direction of the first named spring means.

6. The plural camera of claim 5 in which the blade is coupled to the disc through a pin riding in a slot in said disc.

7. The plural camera of claim 6 in which the second spring means has a lighter bias than the first named spring means and in which the means for rotating the disc in the opposite direction is a knob connected to the blade and permitting the blade to be rotated against the second named spring means through the limited second rotation of the slot and pin coupling to engage said disc and rotate said disc.

8. The plural camera of claim 7 in which the blade covers at least said one aperture in said disc after rotation of the blade through the limited second rotation of the slot and pin coupling in said opposite direction from said predetermined rotation.

9. The plural camera of claim 1 in which the shutter release mechanism is a latch mechanism engaging said stop means on said disc and which when operated allows said stop means to move past the shutter release mechanism to permit rotation of the disc in said predetermined direction under the influence of said spring means.

10. The plural camera of claim 1 and including a contact means positioned in the path of said stop means and engageable by said stop means to operate the same, said contact means being adapted to operate a circuit for a flash mechanism whenever said shutter release mechanism is deflected and said stop means is released to permit rotation of the disc in said predetermined direction under the influence of said first named spring means.

11. The plural camera of claim 1 in which said one of said stop means is longer than the other of said stop means so as to engage said fixed abutment and limit rotation of said disc in said predetermined direction.

12. The plural camera of claim 8 in which the shutter mechanism with the disc and blade and the knob and first and second spring means are removably mounted on the frame and replaceable with a similar shutter mechanism having a different number of apertures therein.

13. The plural camera of claim 12 and including cover means positioned over the shutter mechanism with the knob positioned outside of said cover means.

14. The plural camera of claim 13 and including indicia means positioned on said cover means and aligned with said knob when said disc has been rotated through said predetermined limited rotation in said predetermined direction defined by the first named stop means.

15. A plural camera comprising, a film pack enclosure and a means for advancing the film therein for individual film frames, a camera frame mounted on the film pack end sure, a plural camera lens structure positioned on the camera frame in front of the film frame to be exposed and including means for isolating a portion of the film frame for each of the lens of the plural lens structure, a single shutter mechanism positioned in front of the plural lens structure, said shutter mechanism being comprised of a disc with as many apertures therein as there are plural lens and journaled on said frame for rotation relative to the plural lens structure so that at least one of said apertures in the disc aligns with a lens of a plural lens structure, spring means connected between said disc and said frame and biasing said disc for rotation in a predetermined direction, a plural stop means formed on the periphery of said disc, a shutter release mechanism, each of said stop means on said disc being designed to engage said shutter release mechanism when positioned adjacent to the shutter release to restrict rotation of the disc, said disc when released from said stop means having limited rotation in said predetermined direction to bring at least one of said apertures in the disc into alignment with one of the lens of said plural lens structure, means for covering said aperture when said disc is rotated in a direction opposite to said predetermined direction, said last named means being a masking disc having at least one aperture therein and journaled for limited relative rotation with respect to the shutter disc, and means for manually rotating said disc in the opposite direction, said shutter disc having as many stop means thereon as there are apertures in the shutter disc, at least one fixed abutment positioned on said frame, one of said stop means on said shutter disc being longer than the others to engage said fixed abutment to limit rotation of said shutter disc in said predetermined direction.

16. The plural camera of claim 15 in which said masking disc has as many apertures therein as there are apertures in said shutter disc for simultaneous exposure of the portions of the film frame through the plural lens structure with each operation of the shutter release mechanism.

17. The plural camera of claim 16 in which there is more than one fixed abutment on the camera frame with certain of said abutment being removable to vary the limited rotation of the shutter disc in said predetermined direction in accord with the number of apertures in the masking disc and the number of simultaneous exposure of portions of the film frame with a single shutter release operation.

* * * * *

UNITED STATES PATENT AND TRADEMARK OFFICE
CERTIFICATE OF CORRECTION

PATENT NO. : 4,101,913

DATED : July 18, 1978

INVENTOR(S) : Albert F. Gallistel and Jerome W. Lindenfelser

It is certified that error appears in the above-identified patent and that said Letters Patent are hereby corrected as shown below:

Column 4, line 42, "abutement" should be --abutment--.

Column 5, line 9, "abutement" should be --abutment--.

IN THE CLAIMS

Column 10, line 43, "claimed" should be --claim--.

Column 12, line 14, "end sure" should be --enclosure--.

Signed and Sealed this

Tenth Day of July 1979

[SEAL]

Attest:

LUTRELLE F. PARKER

*Attesting Officer*  *Acting Commissioner of Patents and Trademarks*